US012684563B2

(12) United States Patent
Yue et al.

(10) Patent No.: US 12,684,563 B2
(45) Date of Patent: Jul. 14, 2026

(54) METHOD AND APPARATUS FOR HARMONIZING UPLINK GRANTS

(71) Applicant: LENOVO (BEIJING) LIMITED, Beijing (CN)

(72) Inventors: Ran Yue, Beijing (CN); Jing Han, Beijing (CN); Min Xu, Beijing (CN); Lianhai Wu, Beijing (CN); Haiming Wang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 504 days.

(21) Appl. No.: 18/040,655

(22) PCT Filed: Aug. 6, 2020

(86) PCT No.: PCT/CN2020/107490
§ 371 (c)(1),
(2) Date: Feb. 6, 2023

(87) PCT Pub. No.: WO2022/027472
PCT Pub. Date: Feb. 10, 2022

(65) Prior Publication Data
US 2023/0284214 A1 Sep. 7, 2023

(51) Int. Cl.
*H04W 72/1268* (2023.01)
*H04W 72/566* (2023.01)
*H04W 74/0816* (2024.01)

(52) U.S. Cl.
CPC ..... *H04W 72/1268* (2013.01); *H04W 72/566* (2023.01); *H04W 74/0816* (2013.01)

(58) Field of Classification Search
CPC ........... H04W 72/1268; H04W 72/566; H04W 74/0816
See application file for complete search history.

(56) References Cited

U.S. PATENT DOCUMENTS

2020/0137768 A1 4/2020 Jose et al.
2022/0015187 A1* 1/2022 Huang .............. H04W 72/1268
(Continued)

FOREIGN PATENT DOCUMENTS

CN 109565678 A 4/2019
WO 2020089688 A2 5/2020
(Continued)

OTHER PUBLICATIONS

Patent Cooperation Treaty (PCT) International Application No. PCT/CN/2020/107490, International Search Report and Written Opinion, Apr. 30, 2021.
(Continued)

*Primary Examiner* — Kevin M Cunningham
(74) *Attorney, Agent, or Firm* — Isidore PLLC

(57) ABSTRACT

Embodiments of the present application are directed to a method and apparatus for harmonizing uplink grants. The method may include: determining a priority of at least one uplink grant; and determining the prioritized uplink grant among the overlapped uplink grants. The priority of the at least one uplink grant is determined based on: priorities of logical channels; and/or whether a Medium Access Control (MAC) Packet Data Unit (PDU) is an initial transmission MAC PDU or a retransmission MAC PDU.

17 Claims, 10 Drawing Sheets

(56) References Cited

U.S. PATENT DOCUMENTS

2022/0022224 A1\*   1/2022   Lou ...................... H04L 1/1812
2022/0232523 A1\*   7/2022   Lee ...................... H04L 47/125
2022/0264586 A1\*   8/2022   Qi .......................... H04L 1/1822
2023/0337225 A1\*   10/2023   Alfarhan ............. H04W 72/232

FOREIGN PATENT DOCUMENTS

WO       WO2020087477 A1      5/2020
WO         2020145863 A1      7/2020

OTHER PUBLICATIONS

Report of [AT110e][055][IIOT] MAC: Part 1A, 3GPP Draft, R2-2006046, Jun. 15, 2020, 3rd Generation Partnership Project (3GPP), Mobile Competence Centre, 650 route des Lucioles, F-06921 Sophia-Antipolis Cedex, France, https://ftp.3gpp.org/tsg_ran/WG2_RL2/TSGR2_110-e/Docs/R2-2006046.zip   R2-2006046 [AT110e][055][IIOT]_MAC_1A_V23_Summary.doc.
3rd Generation Partnership Project; Technical Specification Group Radio Access Network; NR; NR and NG-RAN Overall description, Stage 2, (Release 16), ftp://ftp.3gpp.org/Specs/archive/38_series/38.300/38300-g20.zip 38300-g20.docxftp://ftp.3gpp.org/Specs/latest/Rel-16/38_series/38300-g20.zip 38300-g20.docx.
Office Action for PRC (China) Pat. Appln. No. 202080103105.3, dated Dec. 31, 2024.
Office Action dated Jun. 18, 2024, for PRC (China) Pat. Appln. No. 202080103105.3.
Ericsson, R2-2001918, "Summary of open issues for NR-U Running 38.321", 3GPP TSG-RAN WG2 Meeting #109e; Mar. 11, 2020; 20 pages.

\* cited by examiner determining a priority of at least one uplink grant ~ 301 determining the prioritized uplink grant among the overlapped uplink grants ~ 303

METHOD AND APPARATUS FOR HARMONIZING UPLINK GRANTS

TECHNICAL FIELD

The present application generally relates to wireless communication technology, and especially to a method and apparatus for harmonizing uplink grants in unlicensed band in New Radio Industrial Internet of Things (NR-IIoT).

BACKGROUND

In NR-IIoT, a network node may configure two types of uplink grants for a user equipment (UE) to perform uplink transmissions. The uplink grant may indicate some specific radio resources (e.g., time and frequency resources) for the UE to perform uplink transmission. Different service types with different requirements are also introduced in NR-IIoT. For example, enhanced mobile broadband (eMBB) services or ultra-reliable and low latency communications (URLLC) services may be used depending on practical demands. Generally, eMBB services can be used for huge data transmissions and require wide bandwidth. URLLC services can be used for high reliability transmissions and require low latency.

However, in some scenarios, multiple resource allocations (e.g., uplink grants including configured grants (CG)) and/or different types of traffic may be configured to one UE. These resource allocations may be overlapped with each other. For example, time domain and/or frequency domain resource allocations of two uplink grants may be overlapped. Additionally, auto retransmission on a same or different CG configuration is supported in 5G new radio on unlicensed spectrum (NR-U), but not in NR-IIoT (Rel-16).

SUMMARY OF THE APPLICATION

In order to harmonize uplink grants in NR-IIoT and NR-U which is an objective of the present application, the difference priority rules between NR-IIoT and NR-U should be considered and thus the related solutions for applying the feature of NR-IIoT in NR-U are needed. Embodiments of the present application provide a method and apparatus for harmonizing uplink grants.

An embodiment of the present application provides a method. The method may include: determining a priority of at least one uplink grant; and determining the prioritized uplink grant among the overlapped uplink grants.

In an embodiment of the present application, the priority of the at least one uplink grant is determined based on: priorities of logical channels; and/or whether a Medium Access Control (MAC) Packet Data Unit (PDU) is an initial transmission MAC PDU or a retransmission MAC PDU.

In an embodiment of the present application, if a retransmission can be transmitted on the uplink grant and the highest priority among priorities of the logical channels multiplexed in the retransmission MAC PDU is higher than the highest priority among the priorities of the logical channels with data available that are multiplexed or can be multiplexed in an initial transmission MAC PDU to be transmitted on the uplink grant, the priority of the uplink grant is determined by the highest priority among priorities of the logical channels with data available that are multiplexed in the retransmitted MAC PDU. Otherwise, the priority of the uplink grant is determined by the highest priority among priorities of the logical channels with data available that are multiplexed or can be multiplexed in the initial transmission MAC PDU to be transmitted on the uplink grant.

In an embodiment of the present application, the method may further include: determining whether the highest priorities of the logical channels multiplexed in the retransmission MAC PDU and the logical channels are multiplexed or can be multiplexed in the initial transmission MAC PDU to be transmitted on the uplink grant are lower than a threshold. If affirmative, the priority of the uplink grant is determined by the highest priority among priorities of the logical channels multiplexed in the retransmission MAC PDU. If negative, the priority of the uplink grant is determined by the highest priority among the priorities of the logical channels multiplexed in the retransmission MAC PDU or the logical channels are multiplexed or can be multiplexed in an initial transmission MAC PDU to be transmitted on the uplink grant.

In an embodiment of the present application, determining the priority of the at least one uplink grant may further includes: determining if any logical channel enters an urgent state, if a logical channel enters the urgent state, the priority of an uplink grant in which the logical channel is multiplexed or can be multiplexed is determined as the highest priority. Further, the logical channel can be the equal priority with other logical channels that multiplex in other uplink grants or the difference value of the priority of the logical channel comparing with the priority of other logical channel is less than a threshold.

In an embodiment of the present application, determining the priority of the uplink grant is based on a potential retransmission, and the potential retransmission is determined based on a logical channel with a retransmission timer running before selecting the prioritized uplink grant.

In an embodiment of the present application, the method may further include determining whether the priority of the logical channel with the retransmission timer running is greater than a threshold.

In an embodiment of the present application, the method may further include performing Listen-Before-Talk (LBT) for all available uplink grants.

In an embodiment of the present application, the method may further include: performing LBT for all the grants including configured grants and dynamic scheduled grants and the prioritized grant and the de-prioritized grant; and determining whether the prioritized grant is LBT success or LBT failure.

In an embodiment of the present application, the priority of the uplink grant for which only LBT failure MAC CE and no data for logical channels is multiplexed in a MAC PDU is determined as the highest priority or the lowest priority or configured by a network node.

In an embodiment of the present application, the priority of the uplink grant for a Scheduling Request (SR) for LBT failure MAC CE is determined as the highest priority or the lowest priority or configured by a network node.

Another embodiment of the present application provides an apparatus. The apparatus may include a non-transitory computer-readable medium having stored thereon computer-executable instructions; a receiving circuitry; a transmitting circuitry; and a processor coupled to the non-transitory computer-readable medium, the receiving circuitry and the transmitting circuitry. The computer-executable instructions cause the processor to implement the above method.

The embodiments of the present application propose some new rules to prioritize an uplink grant among the overlapped UL grants so as to harmonize uplink grants in NR-IIoT and NR-U.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed description of the appended drawings is intended as a description of preferred embodiments of the present application and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings.

Figure 1:
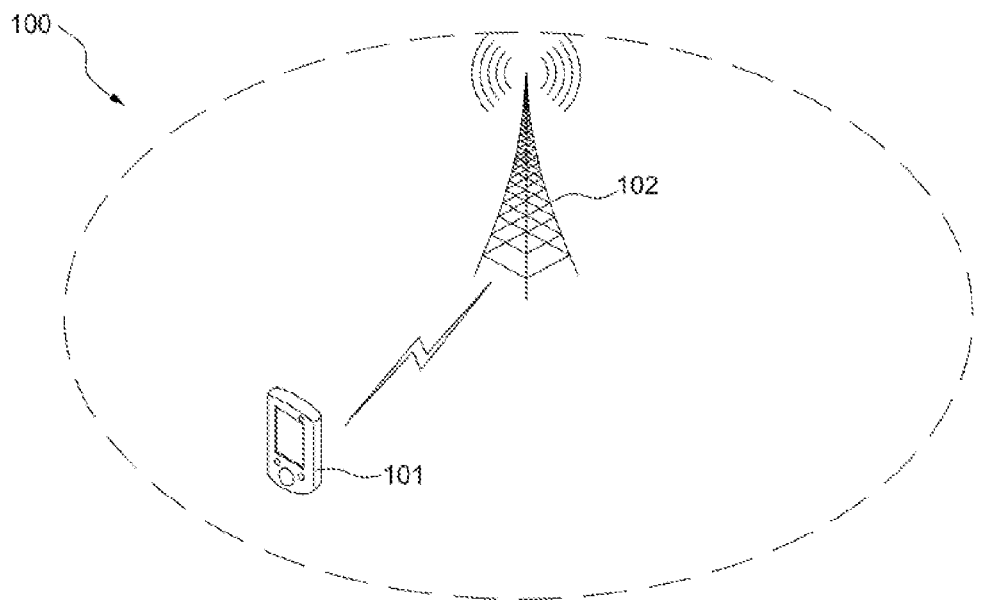
FIG. 1 illustrates a wireless communication system according to some embodiments of the present application.

FIG. 1 illustrates a wireless communication system 100 according to some embodiments of the present application.

Referring to FIG. 1, the wireless communication system 100 may include a UE 101 and a BS 102. Although a specific number of the UE 101 and the BS 102 are depicted in FIG. 1, it is contemplated that additional UEs and BSs may be available in the wireless communication system 100.

The BS 102 may be distributed over a geographic region, and may communicate with a core network (CN) node. In some embodiments of the present application, the BS 102 may also be referred to as an access point, an access terminal, a base, a base unit, a macro cell, a Node-B, an evolved Node B (eNB), a gNB, a Home Node-B, a relay node, or a device, or described using other terminology used in the art. The BS 102 is generally part of a radio access network that may include one or more controllers communicably coupled to one or more corresponding BS(s) 102.

The UE 101 may directly communicate with the BS 102 via uplink communication signals. The UE 101 may be referred to as a subscriber unit, a mobile, a mobile station, a user, a terminal, a mobile terminal, a wireless terminal, a fixed terminal, a subscriber station, a user terminal, or a device, or described using other terminology used in the art.

In some embodiments of the present application, the UE 101 may include, for example, but is not limited to, computing devices, such as desktop computers, laptop computers, personal digital assistants (PDAs), tablet computers, smart televisions (e.g. televisions connected to the Internet), set-top boxes, game consoles, security systems (including security cameras), vehicle on-board computers, network devices (e.g. routers, switches, and modems), Internet of Thing (IoT) devices, industrial Internet-of-Things (IIoT) devices, or the like.

According to some embodiments of the present application, the UE 101 may include, for example, but is not limited to, a portable wireless communication device, a smart phone, a cellular telephone, a flip phone, a device having a subscriber identity module, a personal computer, a selective call receiver, or any other device that is capable of sending and receiving communication signals on a wireless network.

In addition, in some embodiments of the present application, the UE 101 may include, for example, but is not limited to, wearable devices, such as smart watches, fitness bands, optical head-mounted displays, or the like.

The wireless communication system 100 may be compatible with any type of network that is capable of sending and receiving wireless communication signals. For example, the wireless communication system 100 is compatible with networks and networks topologies such as a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 3GPP-based network, a 3GPP 5G network, New Radio (NR) network, Internet-of-Things (IoT) network, Narrow Band Internet of Things (NB-IoT) network and Industrial Internet-of-Things (IIoT) network, a satellite communications network, a high altitude platform network, and/or other communications networks.

In some embodiments of the present application, the wireless communication system 100 is compatible with the 5G new radio of the 3GPP protocol, wherein BSs 102 transmit data using an OFDM modulation scheme on the DL and the UE 101 transmits data on the UL using a single-carrier frequency division multiple access (SC-FDMA) or OFDM scheme. More generally, however, the wireless communication system 100 may implement some other open or proprietary communication protocols, for example, WiMAX, WiFi, among other protocols.

In some embodiments of the present application, the BS 102 may communicate using other communication protocols, such as the IEEE 802.11 family of wireless communication protocols. Further, in some embodiments of the present application, the BS 102 may communicate over licensed spectrums, whereas in other embodiments the BS 102 may communicate over unlicensed spectrums. The present application is not intended to be limited to the implementation of any particular wireless communication system architecture or protocol. In yet some embodiments of present application, the BS 102 may communicate with the UE 101 using the 3GPP 5G protocols.

In NR-IIoT, the BS 102 may configure different types of transmission opportunities (e.g., uplink grants) for the UE

101 to perform uplink transmissions. The uplink grant may indicate some specific radio resources (e.g., time and/or frequency resources) for the UE 101 to perform uplink transmission. One type of the uplink grant may comprise the dynamic grant. The dynamic grant may be configured based on the UE's request. For example, the UE may transmit a prior request to the BS 102. After receiving the request, the BS 102 may configure the dynamic grant according to UE's request for the UE 101 to perform uplink data transmission. The other type of the uplink grant may comprise the configured grant. The configured grant may be configured by the BS 102 without UE's request.

However, in some scenarios, multiple uplink grants and/or different types of traffic may be configured to the UE 101. These uplink grants may be overlapped with each other. For example, time domain and/or frequency domain resource allocations of two uplink grants may be overlapped. When these uplink grants are available, the UE 101 may not be able to simultaneously perform transmissions on the overlapped uplink grants. The UE 101 may need to choose one of them to perform uplink transmission and drop/delay/puncture other uplink grants. Accordingly, some prioritization mechanisms among overlapped uplink grants are needed.

The precondition for all the embodiments of the present application is that the NR-IIoT related feature (for example, the MAC entity of UE is configured with logical channel based prioritization rule, i.e. "lch-basedPrioritization") is configured to apply in the NR-U. In details, the network can configure to enable the function of harmonizing uplink grants in NR-IIoT and NR-U. Or the function of harmonizing uplink grants in NR-IIoT and NR-U can be considered as enabled when the NR-IIoT function e.g. enabled if the MAC entity is configured with lch-basedPrioritization applied in NR-U e.g. identified by configuring with cg-RetransmissionTimer. The uplink grant or uplink resource mentioned in the following can be configured grant, dynamic scheduled PUSCH grant and/or PUCCH grant and/or PRACH. When determining the priority of the grant in the following embodiments of the present application, only configured grants, dynamic scheduled PUSCH grants or the combination of at least two of the configured grants, dynamic scheduled PUSCH grants, PRACH and PUCCH grant should be taken into account.

The first issue is directed to determining the priority of an uplink grant when the MAC entity of UE is configured with the rule of lch-basedPrioritization in NR-U. There are some collision cases shown in FIGS. 2A, 2B and 2C which have not been specified the priority among the uplink grants or logical channels when considering unlicensed band in current URLLC/IIoT operation.

Figure 2A:
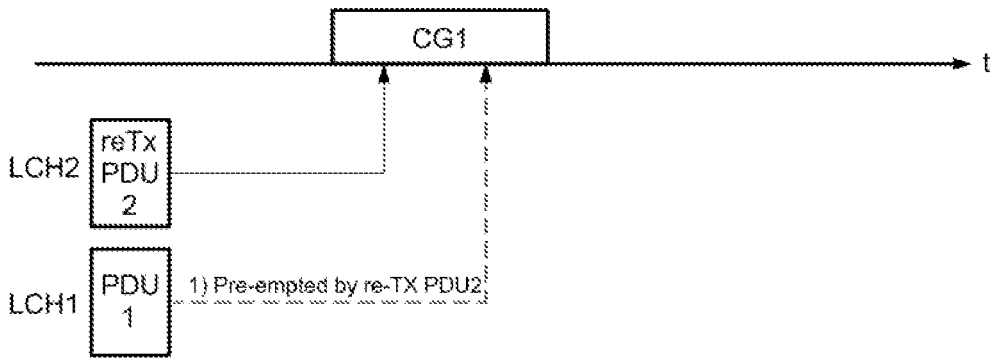
FIG. 2A is a schematic diagram illustrating a scenario of collision case occurred in NR-U.

FIG. 2A is a schematic diagram illustrating a scenario of collision case occurred in NR-U. The UE may be configured with a plurality of logical channels (LCHs). Each LCH may associate with a priority based on the data it carries. Referring to FIG. 2A, the priorities of the logical channels LCH1 and LCH2 in this case is LCH1>LCH2. When it is considered the potential retransmission on uplink grant/uplink resource including the configured grant CG1 and the prioritization rule of NR-U, the collision case illustrated in FIG. 2A may occurs. In NR-U (TS 38.321 and agreements), the UE shall prioritize retransmissions before initial transmissions. Although the priority of the logical channel LCH1 is greater than priority of the logical channel LCH2, the configured grant CG1 is still pre-empted by the packet data unit (PDU) PDU2 because the packet data unit PDU2 is a retransmission PDU. In such circumstances, if the packet data unit PDU1 is IIoT traffic which requires high reliability transmission and low latency, it is not acceptable from view of performance.

Figure 2B:
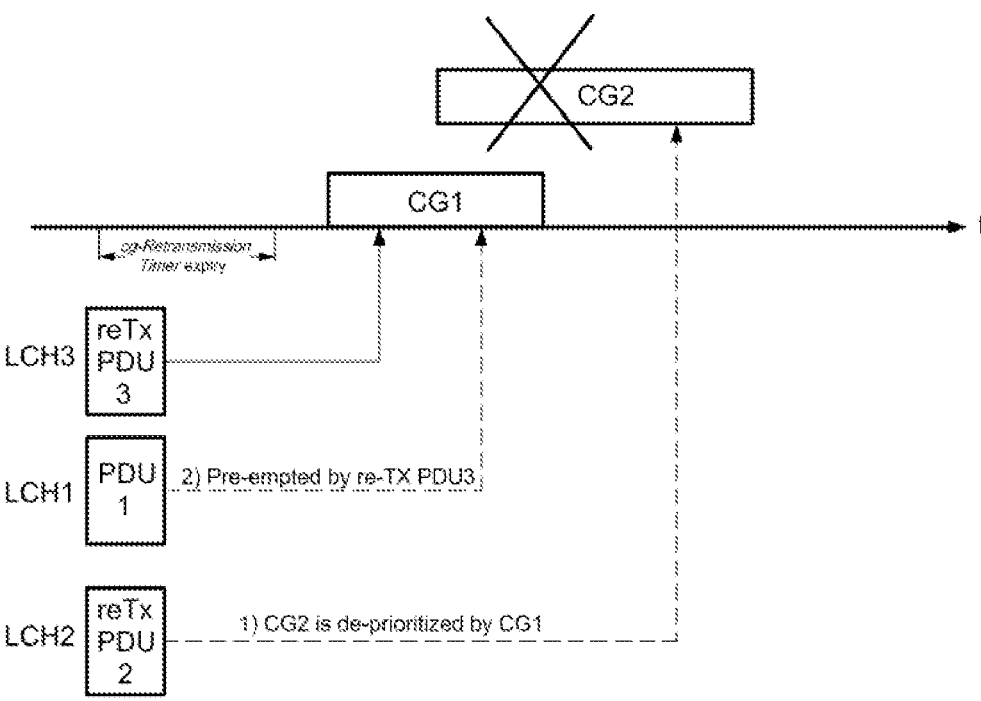
FIG. 2B is a schematic diagram illustrating another scenario of collision case occurred in NR-U and NR-IIoT.

FIG. 2B is a schematic diagram illustrating another scenario of collision case occurred in NR-U and NR-IIoT. Referring to FIG. 2B, the priorities of the logical channels LCH1, LCH2 and LCH3 in this case is LCH1>LCH2>LCH3. When the configured grant CG1 and configured grant CG2 collide, the configured grant CG1 is prioritized based on the rule of lch-basedPrioritization because the priority of the logical channel LCH1 is greater than that of the logical channel LCH2. In other words, the configured grant CG2 is de-prioritized by the configured grant CG1. Additionally, before the packet data unit PDU1 is transmitted, the packet data unit PDU3 corresponding to the logical channel LCH3 needs to be retransmitted because the cg-RetransmissionTimer for the PDU3 HARQ process expires and it means NACK for the previous transmission of the packet data unit PDU3. Then, if following the rule of NR-U and if the Transport Block Size (TBS) configured by the grant CG1 is the same as the TBS of the packet data unit PDU3, the configured grant CG1 is pre-empted by the retransmission of the packet data unit PDU3 although the priority of the logical channel LCH3 is lower than that of the logical channel LCH1. If the packet data units PDU1 and PDU2 are IIoT traffics, it is not acceptable from view of performance.

Figure 2C:
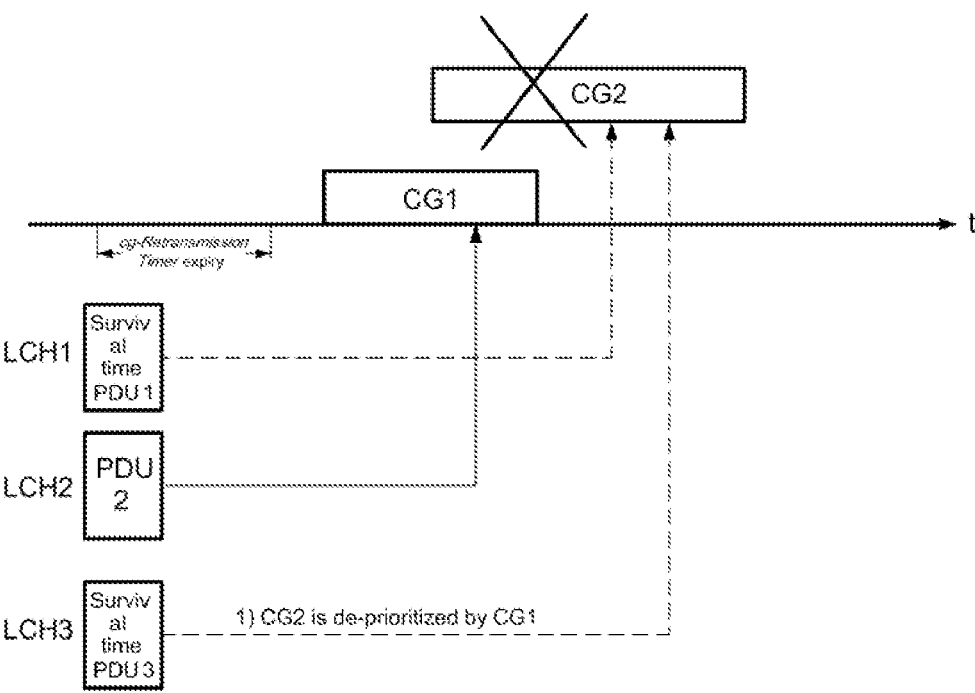
FIG. 2C is a schematic diagram illustrating yet another scenario of collision case occurred in NR-U and NR-IIoT with consideration of an urgent state.

FIG. 2C is a schematic diagram illustrating yet another scenario of collision case occurred in NR-U and NR-IIoT with consideration of an urgent state. Referring to FIG. 2C, the priorities of the logical channels LCH1, LCH2 and LCH3 in this case is LCH2>LCH1>LCH3. It is assumed that the traffics on the logical channels LCH1 and LCH2 are IIoT traffics, that the logical channel LCH1 enters the urgent state/the state of survival time with the expiry of cg-RetransmissionTimer and that the TBS of the packet data unit PDU1 is the same with that configured by the configured grant CG2. While the packet data unit PDU1 into the urgent state cannot be retransmitted because the configured grant CG2 is de-prioritized by the configured grant CG1 and the traffic on the logical channel LCH1 cannot survive from the urgent state which may lead the application enters down state.

The second issue is directed to determining the priority of an uplink grant when the prioritized grant fails to acquire channel. Specifically, there is a case that the configured grant CG1 fails to acquire channel while the configured grant CG2 which is overlapped with the configured grant CG1 succeeds to acquire channel if Listen-Before-Talk (LBT) is performed on the configured grant CG2 in FIG. 2B or FIG. 2C. However, according to the description of current MAC specification, if both of the features used in NR-IIoT and NR-U are enabled, the procedure of the MAC entity of UE is deciding the priority of the collision uplink grants prior to the outcome of LBT. Then, as shown in FIG. 2B and FIG. 2C, the configured grant CG2 has been de-prioritized without considering the outcome of LBT. Accordingly, the resources (e.g., configured grant CG2) may be waste.

The third issue is directed to prioritize the LBT failure Medium Access Control (MAC) Control Element (CE) and the corresponding Scheduling Request (SR). In NR-U, the LBT failure MAC CE is introduced to recover from a consistent LBT failure and a SR transmission can be triggered for LBT failure MAC CE. While in NR-IIoT, the LBT failure MAC CE is not needed and a SR triggered by MAC CE is not taken into account. Therefore, the priority should be decided when PUCCH resource with SR transmission for LBT failure MAC CE overlaps with a PUSCH duration. Also, the priority needs to be decided when a PUSCH duration with only the LBT failure MAC CE overlaps with another PUSCH duration or PUCCH resource.

In the present application, we propose several options/ solutions to solve the above issues/collisions.

Figure 3:
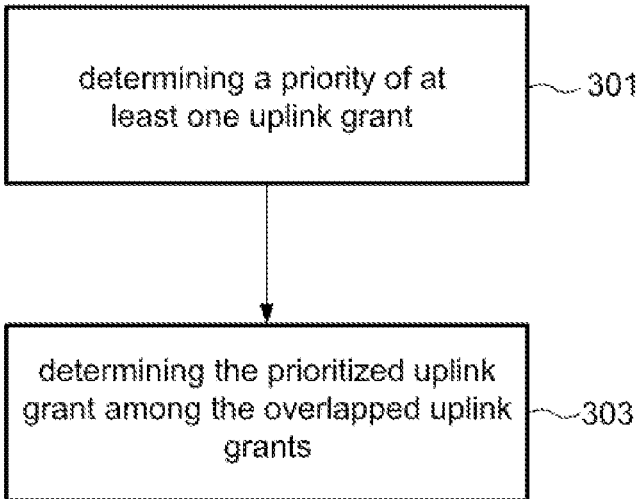
FIG. 3 illustrates a method performed by a UE according to a preferred embodiment of the present application.

FIG. 3 illustrates a method performed by a UE according to a preferred embodiment of the present application. Referring to FIG. 3, in step 301, the UE determines a priority of at least one uplink grant. In step 303, the UE determines the prioritized uplink grant among the overlapped uplink grants. Based on the concept illustrated in FIG. 3, all the options/ solutions described below can be applied in the case of deciding the priority on one grant and/or selecting a prioritized grant among the overlapped uplink grants.

Regarding the first issue, the first option is directed to determining the priority of the at least one uplink grant based on: priorities of logical channels; and/or whether a Medium Access Control (MAC) Packet Data Unit (PDU) is a MAC PDU with initial transmission (hereinafter also referred to as "an initial transmission MAC PDU") or a retransmission MAC PDU.

Specifically, if the retransmission can be transmitted on the uplink grant and the highest priority among priorities of the logical channels multiplexed in the retransmission MAC PDU is higher than the highest priority among priorities of the logical channels with data available that are multiplexed or can be multiplexed in an initial transmission MAC PDU to be transmitted on the uplink grant, the priority of the uplink grant is determined by the highest priority among priorities of the logical channels with data available that are multiplexed in the retransmitted MAC PDU. Otherwise, the priority of the uplink grant is determined by the highest priority among priorities of the logical channels with data available that are multiplexed or can be multiplexed in an initial transmission MAC PDU to be transmitted on the uplink grant.

Figure 4A:
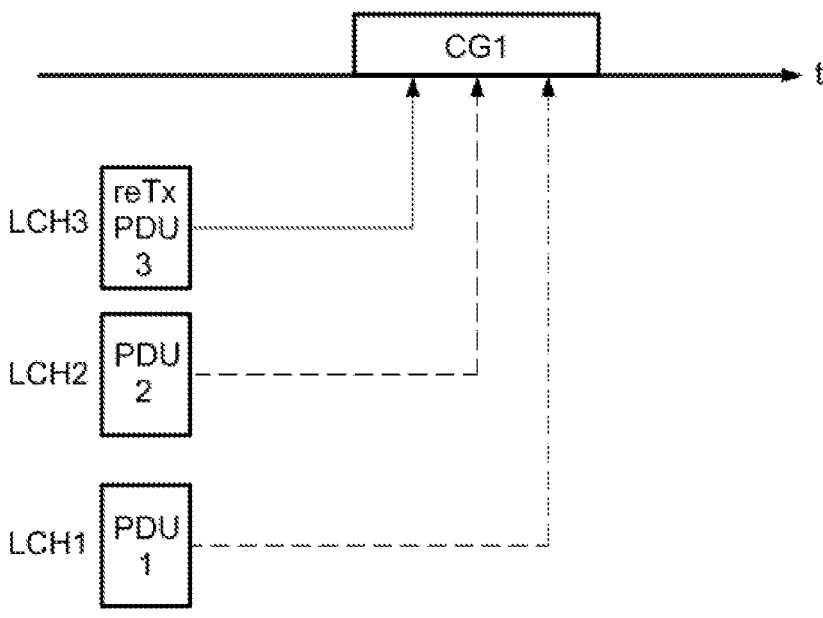
FIG. 4A and FIG. 4B illustrate two scenarios for determining the priority of an uplink grant according to some embodiments of the present application.
Figure 4B:
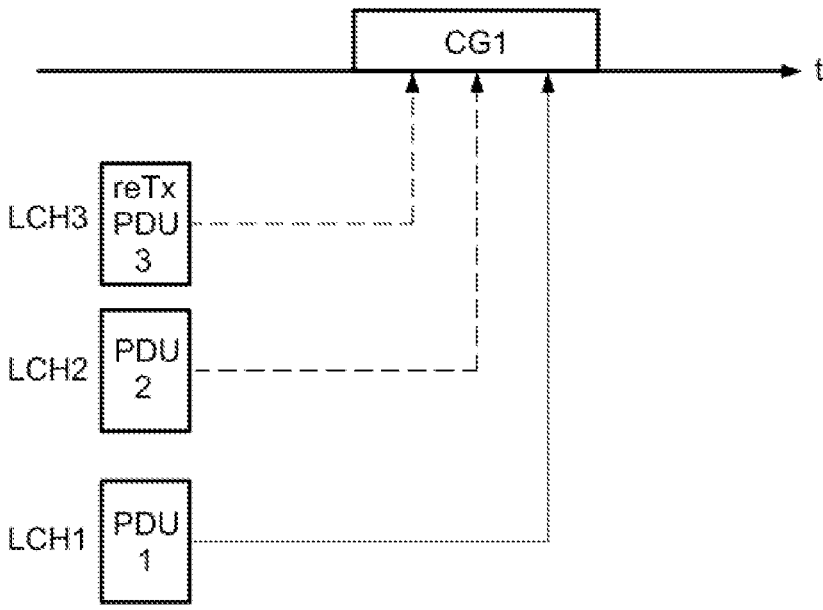

FIG. 4A and FIG. 4B illustrate two scenarios for determining the priority of an uplink grant according to some embodiments of the present application. Referring to FIG. 4A, it is assumed that the priorities of the logical channels LCH1, LCH2 and LCH3 in this case is LCH3>LCH1>LCH2. If the retransmission of the packet data unit PDU3 can be transmitted on the configured grant CG1 (i.e., the TBS of the packet data unit PDU3 is the same as the TBS allocated by the configured grant CG1), the configured grant CG1 is pre-empted by the retransmission of the packet data unit PDU3 because the priority of the logical channel LCH3 multiplexed in the retransmission MAC PDU 3 is higher than the priorities of the logical channels LCH1 and LCH2 with data available that are multiplexed or can be multiplexed in the initial transmission MAC PDU 1 or MAC PDU 2.

Referring to FIG. 4B, it is assumed that the priorities of the logical channels LCH1, LCH2 and LCH3 in this case is LCH1>LCH3>LCH2. The retransmission of packet data unit PDU3 can be transmitted on the configured grant CG1. However, the priority of the logical channel LCH3 is lower than the highest priority among the priorities of the logical channels with data available that are multiplexed in the initial transmission MAC PDU (i.e., the highest priority is the priority of LCH1 in the initial transmission MAC PDU 1). Therefore, although the packet data unit PDU3 is a retransmission PDU, the priority of the configured grant CG1 is determined by the priority of the logical channel LCH1 with data available that is multiplexed or can be multiplexed in the initial transmission MAC PDU1.

Accordingly, in order to deal with the first issue, the first option in the present application may include: for the MAC entity configured with lch-basedPrioritization and for configured uplink grants configured with cg-RetransmissionTimer, the UE implementation selects an HARQ Process ID among the HARQ process IDs available for the configured grant configuration. The UE shall prioritize retransmissions before initial transmissions if the LCH priority of the retransmission is higher than the initial transmissions. Also, for the MAC entity configured with lch-basedPrioritization and for configured uplink grants configured with cg-RetransmissionTimer, priority of an uplink grant is determined by the highest priority among priorities of the logical channels with data available that are multiplexed or can be multiplexed in the MAC PDU or in the retransmission MAC PDU, according to some mapping restrictions. When collision involving PRACH or the PUSCH used for the RACH procedure happens, consider PRACH or the PUSCH used for the RACH procedure has the highest priority. For example, the resource for Msg3 or MsgA of the RACH procedure overlaps with other PUSCH resource(s) which is not for the RACH procedure or overlaps with other PUCCH resource(s), consider the resource for Msg3 or MsgA has the highest priority. It is up to UE implementation to determine the priority when both or all of the collision resources are for RACH procedure.

Regarding the first issue, the second option is directed to prioritize retransmission prior to initial transmission applying to eMBB services. Generally, eMBB services can be used for huge data transmissions and require wide bandwidth. The second option is similar to the first option, and the difference between them lies in that the second option may further includes determining whether the highest priorities of the logical channels multiplexed in the retransmission MAC PDU and the logical channels are multiplexed or can be multiplexed in an initial transmission MAC PDU to be transmitted on the uplink grant are lower than a threshold.

If the highest priorities of the logical channels multiplexed in the retransmission MAC PDU and logical channels are multiplexed or can be multiplexed in a MAC PDU to be transmitted as the initial transmission MAC PDU are lower than the threshold, the UE shall prioritize retransmissions before initial transmissions and the priority of the uplink grant is determined by the highest priority among priorities of the logical channels multiplexed in the retransmission MAC PDU. For configured uplink grants configured with cg-Retransmission Timer, the UE implementation selects a HARQ Process ID among the HARQ process IDs available for the configured grant configuration. The UE shall prioritize retransmissions before initial transmissions. The UE shall toggle the NDI in the CG-UCI for new transmissions and not toggle the NDI in the CG-UCI in retransmissions.

Otherwise, if the highest priority among priorities of the logical channels multiplexed in the retransmissions MAC PDU and logical channels multiplexed in a MAC PDU or can be multiplexed in a MAC PDU to be transmitted as the initial transmission MAC PDU are equal to or greater than the threshold, the priority of the uplink grant is determined by: (i) the highest priority among the priorities of the logical channels multiplexed in the retransmission MAC PDU; or (ii) the logical channels multiplexed in an initial transmission MAC PDU to be transmitted on the uplink grant.

Specifically, if the retransmission can be transmitted on the uplink grant and the highest priority among priorities of the logical channels multiplexed in the retransmission MAC PDU is higher than the highest priority among priorities of the logical channels with data available that are multiplexed or can be multiplexed in an initial transmission MAC PDU to be transmitted on the uplink grant, the priority of the uplink grant is determined by the highest priority among priorities of the logical channels with data available that are multiplexed in the retransmitted MAC PDU. Otherwise, the priority of the uplink grant is determined by the highest priority among priorities of the logical channels with data available that are multiplexed or can be multiplexed in an initial transmission MAC PDU to be transmitted on the uplink grant.

Regarding the first issue, the third option is directed to determining if any logical channel enters an urgent state. In some embodiments, a timer (e.g., cg-RetransmissionTimer) expiration is used to decide a data transmission is in an urgent state. The urgent state is determined based on a related parameter of survival time. In 3GPP TS 22.104, the survival time is defined as the time that an application consuming a communication service may continue without an anticipated message. The survival time can be expressed as a period or, especially with cyclic traffic, as maximum number of consecutive incorrectly received or lost messages. In some examples, a communication service is considered unavailable if it does not meet the pertinent QoS requirements. If availability is one of these requirements, the system is considered unavailable if an expected message is not received within a specified time, which, at minimum, is the sum of maximum allowed end-to-end latency and survival time.

Specifically, in the third option, determining the priority of the at least one uplink grant may further includes determining if any logical channel enters an urgent state. If a logical channel enters the urgent state, the priority of an uplink grant in which the logical channel is multiplexed or can be multiplexed is determined as the highest priority. Alternatively, the logical channel enters the urgent state is determined as the highest priority among the logical channels with equal priority or logical channels that the difference value of the priorities is less than a threshold.

Figure 4C:
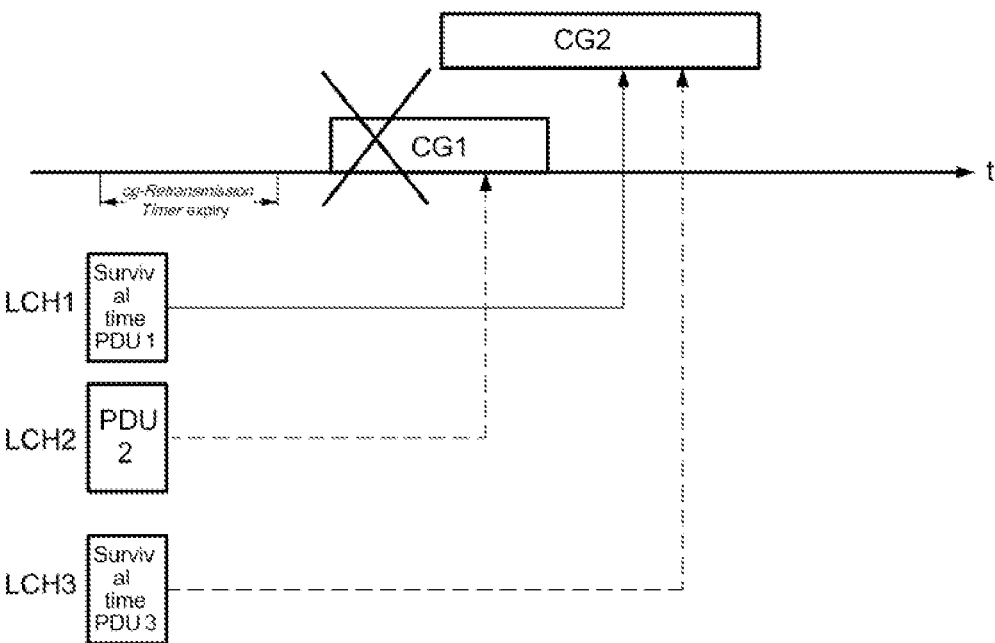
FIG. 4C illustrates a scenario for determining the prioritized uplink grant among the overlapped uplink grants according to some embodiments of the present application.

Therefore, when apply the prioritization rule proposed in the third option into the scenario shown in FIG. 2C, the result will be different. FIG. 4C illustrates a scenario for determining the prioritized uplink grant among the overlapped uplink grants according to some embodiments of the present application. Referring to FIG. 4C, the logical channel LCH1 enters the state of survival time with the expiry of cg-RetransmissionTimer and the TBS of the packet data unit PDU1 is the same with the configured grant CG2. When apply the prioritization rule proposed in the third option into the scenario, the priority of the configured grant CG2 in which the logical channel LCH1 is multiplexed or can be multiplexed will be determined as the highest priority. That is, the configured grant CG2 is prioritized over the configured grant CG1, or in other words, the configured grant CG1 is de-prioritized by the configured grant CG2.

In some circumstances, if more than one logical channel enters the urgent state, the method in the third option may further include determining Packet Delay Budget (PDB) values among the logical channels entering the urgent state. For example, the priority of the uplink grant for the data traffic in the logical channel entering the urgent state with the smallest PDB value is determined as the highest priority.

Regarding the first issue, the fifth option is directed to considering a potential retransmission when prioritizing an uplink grant. The potential retransmission is determined based on a logical channel with a retransmission timer running before selecting the prioritized uplink grant. Specifically, if a timer (e.g., cg-RetransmissionTimer) expiry is prior to assembling the MAC PDU in an uplink grant, the logical channel with cg-RetransmissionTimer running should be taken into account when considering the candidate logical channels for prioritizing. For example, the priority of the logical channel LCH1 shown in FIG. 2C should be compared when deciding to prioritize or de-prioritize uplink grant CG2.

Regarding the first issue, the sixth option is directed to considering the potential high priority retransmission when prioritizing an uplink grant. The method in the sixth option are similar to that of the fifth option, and the difference between them lies in that the method in the sixth option may further include determining whether the priority of the logical channel with the retransmission timer running is greater than a threshold. For example, if the priority of the logical channel with the retransmission timer running is greater than the threshold, the priority of the logical channel LCH1 shown in FIG. 2C should be taken into account when deciding to prioritize or de-prioritize uplink grant CG2. If the priority of the logical channel with the retransmission timer running is not greater than the threshold, then the priority of the logical channel LCH1 shown in FIG. 2C will not be taken into account when deciding to prioritize or de-prioritize uplink grant CG2.

Regarding the second issue, the first option is directed to performing Listen-Before-Talk (LBT) for all the potential uplink grants.

A BS (e.g., the BS 102 shown in FIG. 1) and a UE (e.g., the UE 101 shown in FIG. 1) may operate in both licensed and unlicensed spectrum. LBT is a channel access technique used for transmission on an unlicensed spectrum. For transmission on unlicensed spectrum, in order to achieve fair coexistence with other wireless systems, an LBT procedure is required to be performed before a transmitter/transmitting circuitry (e.g., a BS or a UE) can start a transmission on an unlicensed spectrum.

In order to deal with the second issue (e.g., in order to avoid waste of uplink grants), the method in the first option may include performing LBT for all available uplink grants including the configured grants and/or dynamic scheduled grants and/or the prioritized grant and/or the de-prioritized grant, and then deciding the priority of the uplink grant which is LBT success. For example, if the prioritized grant CG1 resource is in front of the de-prioritized grant CG2 and LBT fails on grant CG1, LBT on grant CG2 should be performed. The two overlapping UL grants can be configured in different subbands or in the same subband. The UE is allowed to transmit on the prioritized grant because of LBT success or the prioritized grant is previous de-prioritized grant and it is prioritized because LBT succeeds and the previous prioritized grant LBT fails. For example, there are two overlapped configured resources CG1 and CG2. Perform LBT for both CG1 and CG2 before determining which one is prioritized grant or de-prioritized grant. For another example, autonomous retransmission would in this case apply to the prioritized grant and autonomous retransmission can be performed on grant CG2 if LBT succeeds on grant CG2. In one example, the UE perform LBT for grant CG1 (lower priority grant) and in case it succeeds it will transmit the lower priority grant for a configured time duration e.g., one (1) symbol and then transmit the data/PDU which will assemble or is assembled to be transmitted on grant CG2 (high priority grant). This behavior could be also allowed depending on how large the priority offset between grants CG2 and CG1 is, i.e. threshold (To) defined for the priority offset between CG2 and CG1, if the priority offset between CG2 and CG1<To or>To, the above highlight behavior is allowed.

Regarding the second issue, the second option is directed to prioritizing the de-prioritized grant according to the LBT outcome. Specifically, the method of the second option may include: performing LBT for the prioritized grant and the de-prioritized grant; and determining whether the prioritized grant is LBT success or LBT failure. If the prioritized grant is LBT success, the order of the priorities of the overlapped uplink grants remains unchanged. If the prioritized grant is LBT failure while the de-prioritized grant is LBT success, the prioritized grant is determined as de-prioritized and the de-prioritized grant is determined as prioritized. The UE is allowed to transmit on the prioritized grant because of LBT success. For example, autonomous retransmission would in this case apply to the prioritized grant and autonomous retransmission can be performed on grant CG2 if LBT succeeds on grant CG2. In one example, the UE perform LBT for grant CG1 (lower priority grant) and in case it succeeds it will transmit the lower priority grant for a configured time duration, e.g., one (1) symbol, and then transmit the data/PDU which will assemble or is assembled to be transmitted on CG2 (high priority grant). This behavior could be also allowed depending on how large the priority offset between grants CG2 and CG1 is, i.e. threshold (To) defined for the priority offset between CG2 and CG1, if the priority offset between CG2 and CG1<To or>To, the above highlight behavior is allowed.

Regarding the second issue, the third option is directed to mapping generated Tranport Block(s) (TB(s))/PDU to different HARQ processes. If the PDU associated with the previous (prioritized) grant and the grant is deprioritized, and the PDU can be transmitted on the prioritized grant which is LBT success or the prioritized grant is previous de-prioritized grant and it is prioritized because LBT succeeds and the previous prioritized grant LBT fails with some restrictions. The third option can be applied with the first option or the second option for the second issue. Specifically, The UE is allowed to map generated TB(s) internally to different HARQ processes in case of the grant de-prioritized, i.e. a UE may transmit a new TB on any HARQ process in the grants that have the same TBS, the same Redundancy Version (RV) (optionally, the New Data Indications (NDIs) indicate new transmission).

The third issue is directed to prioritize the LBT failure Medium Access Control (MAC) Control Element (CE) and the corresponding Scheduling Request (SR). In the present application, the priority of the uplink grant for which only LBT failure MAC CE and no data for logical channels is multiplexed in a MAC PDU can be determined as the highest priority or the lowest priority or configured by a network node. Alternatively, the priority of the uplink grant e.g. PUCCH for a SR for LBT failure MAC CE is determined as the highest priority or the lowest priority or configured by a network node.

Specifically, in the first option, the PUCCH resource is prioritized when PUCCH resource with SR transmission for LBT failure MAC CE overlaps with a PUSCH duration if the MAC entity is configured with or enables the priority rules for the NR-IIoT/URLLC feature e.g. lch-basedPrioritization in NR-U. Also, the PUSCH duration is prioritized when PUSCH duration with only the LBT failure MAC CE overlaps with another PUSCH duration or PUCCH resource if the MAC entity is configured with or enables the priority rules for the NR-IIoT/URLLC feature e.g. lch-basedPrioritization in NR-U.

In the second option, the PUCCH resource is de-prioritized when PUCCH resource with SR transmission for LBT failure MAC CE overlaps with a PUSCH duration if the MAC entity is configured with or enables the priority rules for the NR-IIoT/URLLC feature e.g. lch-basedPrioritization in NR-U. The PUSCH duration is de-prioritized when PUSCH duration with only the LBT failure MAC CE overlaps with another PUSCH duration or PUCCH resource if the MAC entity is configured with or enables the priority rules for the NR-IIoT/URLLC feature e.g. lch-basedPrioritization in NR-U.

In the third option, the priority of LBT failure MAC CE and/or the corresponding SR or PUCCH for the corresponding SR can be configured by the network node/BS.

Therefore, the above described embodiments can harmonize UL grant in NR-U and NR-IIoT, and some new rules to prioritize a UL grant among the overlapped UL grants are proposed in the present application. First, when there is overlap between the uplink grants for retransmission and initial transmission, the priority of the uplink grant is determined based on the comparison of the priority of logical channel and the transmission state (initial transmission or retransmission) of the packet data unit. And if the logical channel enters the urgent state is determined as the highest priority. Second, in order to avoid the waste of uplink grants, the LBT outcome can be a condition of prioritizing a de-prioritized grant. Third, some options/solutions have been proposed to overcome the resources overlapping cases when applying the NR-IIoT feature in NR-U.

Figure 5:
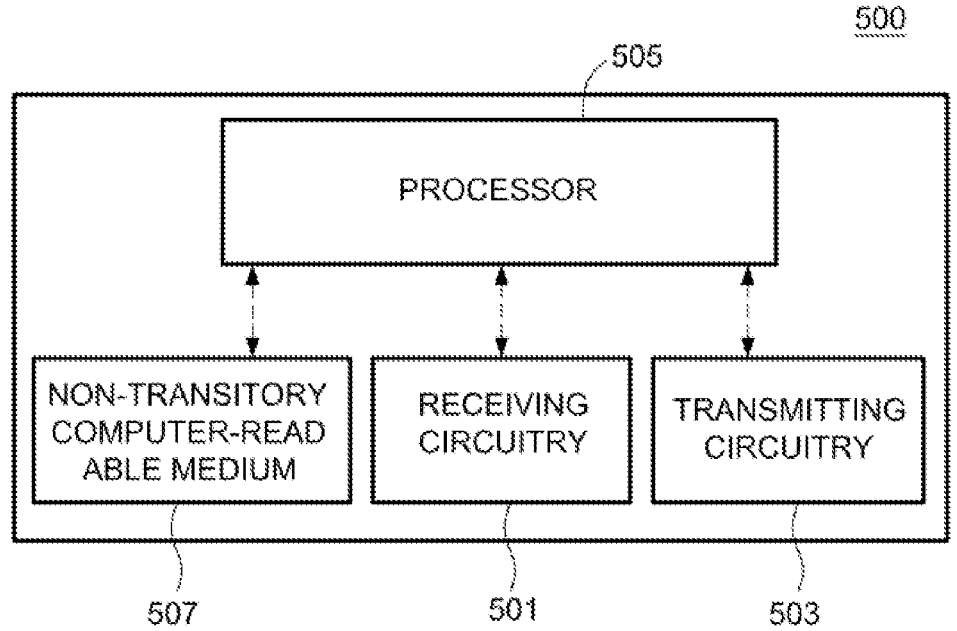
FIG. 5 illustrates an apparatus according to some embodiments of the present application.

FIG. 5 illustrates an apparatus according to some embodiments of the present application. In some embodiments of the present disclosure, the apparatus 500 may be or include a UE 101 as illustrated in FIG. 1 or other embodiments of the present application.

As shown in FIG. 5, the apparatus 500 may include a receiving circuitry 501, a transmitting circuitry 503, a processer 505, and a non-transitory computer-readable medium 507. The non-transitory computer-readable medium 507 has computer executable instructions stored therein. The processer 505 is configured to be coupled to the non-transitory computer readable medium 507, the receiving circuitry 501, and the transmitting circuitry 503. It is contemplated that the apparatus 500 may include more computer-readable mediums, receiver, transmitter and processors in some other embodiments of the present application according to practical requirements. In some embodiments of the present application, the receiving circuitry 501 and the transmitting circuitry 503 are integrated into a single device, such as a transceiver. In certain embodiments, the apparatus 500 may further include an input device, a memory, and/or other components.

In some embodiments of the present application, the non-transitory computer-readable medium 507 may have stored thereon computer-executable instructions to cause a processor to implement the method according to embodiments of the present application.

Figure 6:
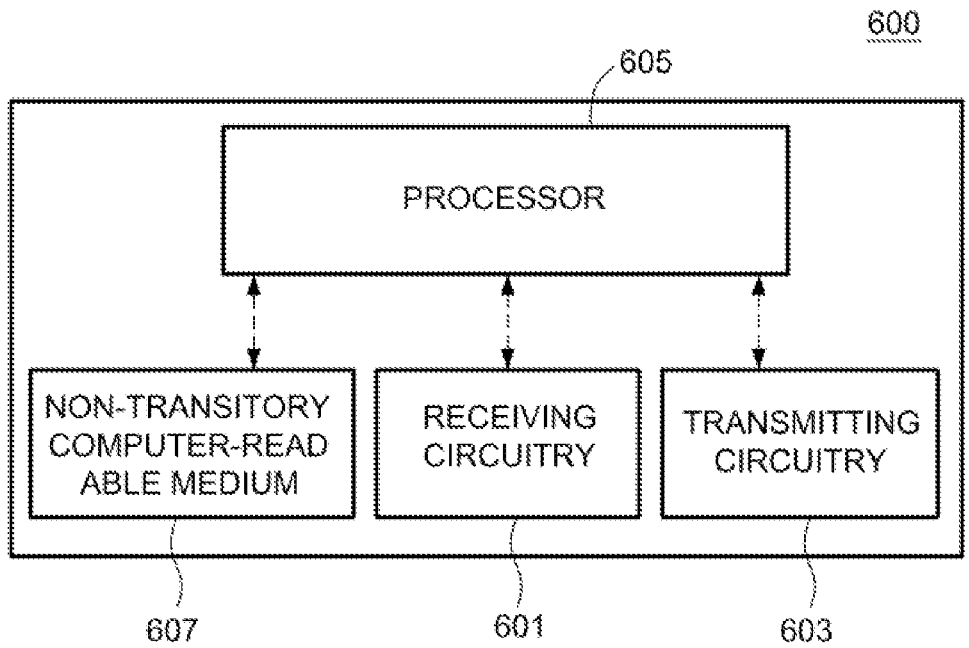
FIG. 6 illustrates an apparatus according to some embodiments of the present application.

FIG. 6 illustrates an apparatus according to some embodiments of the present application. In some embodiments of the present disclosure, the apparatus 600 may be or include a BS 102 as illustrated in FIG. 1 or other embodiments of the present application.

As shown in FIG. 6, the apparatus 600 may include a receiving circuitry 601, a transmitting circuitry 603, a processer 606, and a non-transitory computer-readable medium 607. The non-transitory computer-readable medium 607 has computer executable instructions stored therein. The processer 606 is configured to be coupled to the non-transitory computer readable medium 607, the receiving circuitry 601, and the transmitting circuitry 603. It is contemplated that the apparatus 600 may include more computer-readable mediums, receiver, transmitter and processors in some other embodiments of the present application according to practical requirements. In some embodiments of the present application, the receiving circuitry 601 and the transmitting circuitry 603 are integrated into a single device, such as a transceiver. In certain embodiments, the apparatus 600 may further include an input device, a memory, and/or other components.

In some embodiments of the present application, the non-transitory computer-readable medium 607 may have stored thereon computer-executable instructions to cause a processor to implement the method according to embodiments of the present application.

Persons skilled in the art should understand that as the technology develops and advances, the terminologies described in the present application may change, and should not affect or limit the principle and spirit of the present application.

Those having ordinary skill in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

What is claimed is:

1. A method, comprising:
determining a priority of at least one uplink grant at a user equipment (UE) configured to utilize resource allocations for both New Radio Industrial Internet of Things (NR-IIOT) and 5G new radio on unlicensed spectrum (NR-U), the priority determined, in part, based on priorities of a plurality of logical channels each carrying different data for uplink transmission and whether a Medium Access Control (MAC) Packet Data Unit (PDU) within each logical channel of the plurality of logical channels is an initial transmission MAC PDU or one of a re-transmission MAC PDU or a MAC PDU of a logical channel that is in an urgent state;
determining whether the highest priorities of the logical channels multiplexed in the re-transmission MAC PDU and the logical channels that can be multiplexed in the initial transmission MAC PDU to be transmitted on the uplink grant resource are lower than a threshold;
responsive to the highest priorities of all MAC PDUs being lower than the threshold, prioritizing retransmissions before initial transmissions, wherein the priority of the uplink grant is determined by a highest priority among priorities of the logical channels multiplexed in the retransmission MAC PDU;
responsive to the UE being allocated overlapped uplink grant resources, determining a prioritized uplink grant resource among the overlapped uplink grant resources, in part based on which one of the overlapped uplink grant resources is assigned to the MAC PDU of a logical channel that is prioritized for uplink transmission from among the plurality of logical channels; and
transmitting the MAC PDU multiplexed within an uplink transmission corresponding to the prioritized uplink grant resource.

2. The method of claim 1, wherein
if a retransmission can be transmitted on the uplink grant and the highest priority among priorities of the logical channels multiplexed in the retransmission MAC PDU is higher than the highest priority among the priorities of the logical channels with data available that can be multiplexed in the initial transmission MAC PDU to be transmitted on the uplink grant resource, the priority of the uplink grant is determined by the highest priority among priorities of the logical channels with data available that are multiplexed in the retransmitted MAC PDU; and
if the highest priority among priorities of the logical channels multiplexed in the retransmission MAC PDU is equal to or lower than the highest priority among the priorities of the logical channels with data available that are multiplexed in the initial transmission MAC PDU to be transmitted on the uplink grant, the priority of the uplink grant is determined by the highest priority among priorities of the logical channels with data available that can be multiplexed in the initial transmission MAC PDU to be transmitted on the uplink grant.

3. An apparatus comprising:
a non-transitory computer-readable medium having stored thereon computer-executable instructions;
a receiving circuitry;
a transmitting circuitry;
the apparatus configured to utilize resource allocations for both New Radio Industrial Internet of Things (NR-IIoT) and 5G new radio on unlicensed spectrum (NR-U); and
a processor coupled to the non-transitory computer-readable medium, the receiving circuitry and the transmitting circuitry, wherein the computer-executable instructions cause configure the processor to cause the apparatus to:

determine a priority of at least one uplink grant, the priority determined, in part, based on priorities of a plurality of logical channels each carrying different data for uplink transmission and whether a Medium Access Control (MAC) Packet Data Unit (PDU) within each logical channel of the plurality of logical channels is an initial transmission MAC PDU or one of a re-transmission MAC PDU or a MAC PDU of a logical channel that is in an urgent state;

determine whether the highest priorities of the logical channels multiplexed in the re-transmission MAC PDU and the logical channels that can be multiplexed in the initial transmission MAC PDU to be transmitted on the uplink grant resource are lower than a threshold;

responsive to the highest priorities of all MAC PDUs being lower than the threshold, prioritize retransmissions before initial transmissions, wherein the priority of the uplink grant is determined by a highest priority among priorities of the logical channels multiplexed in the retransmission MAC PDU;

responsive to the apparatus being allocated overlapped uplink grant resources, determine a prioritized uplink grant among the overlapped uplink grant resources, in part based on which one of the overlapped uplink grant resources is assigned to the MAC PDU of a logical channel that is prioritized for uplink transmission from among the plurality of logical channels; and transmit the MAC PDU multiplexed within an uplink transmission corresponding to the prioritized uplink grant resource.

4. The apparatus of claim 3, wherein if a retransmission can be transmitted on the uplink grant and the highest priority among priorities of the logical channels multiplexed in the retransmission MAC PDU is higher than the highest priority among the priorities of the logical channels with data available that can be multiplexed in the initial transmission MAC PDU to be transmitted on the uplink grant, the priority of the uplink grant is determined by the highest priority among priorities of the logical channels with data available that are multiplexed in the retransmitted MAC PDU.

5. The apparatus of claim 4, wherein if the highest priority among priorities of the logical channels multiplexed in the retransmission MAC PDU is equal to or lower than the highest priority among the priorities of the logical channels with data available that are multiplexed in the initial transmission MAC PDU to be transmitted on the uplink grant, the priority of the uplink grant is determined by the highest priority among priorities of the logical channels with data available that can be multiplexed in the initial transmission MAC PDU to be transmitted on the uplink grant.

6. The apparatus of claim 5, wherein if the highest priorities of the logical channels multiplexed in the retransmission MAC PDU and logical channels that can be multiplexed in a MAC PDU to be transmitted as the initial transmission MAC PDU are lower than a threshold, the at least one processor:

prioritizes retransmissions before initial transmissions on the uplink grant, wherein the priority of the uplink grant is determined by the highest priority among priorities of the logical channels multiplexed in the retransmission MAC PDU.

7. The apparatus of claim 5, wherein if the highest priority among priorities of the logical channels multiplexed in the retransmissions MAC PDU and logical channels multiplexed in a MAC PDU to be transmitted as the initial transmission MAC PDU are equal to or greater than the threshold, the priority of the uplink grant is determined by the highest priority among the priorities of the logical channels multiplexed in the retransmission MAC PDU or the logical channels multiplexed or that can be multiplexed in an initial transmission MAC PDU to be transmitted on the uplink grant.

8. The apparatus of claim 3, wherein if more than one logical channels enter an urgent state, the at least one processor:

determines Packet Delay Budget (PDB) values among the logical channels entering the urgent state, wherein the priority of the uplink grant for the data traffic in the logical channel entering the urgent state with the smallest PDB value is determined as the highest priority.

9. The apparatus of claim 3, wherein to determine the priority of the at least one uplink grant, the at least one processor:

determines if any logical channel enters an urgent state, wherein if a logical channel enters the urgent state, the priority of an uplink grant in which the logical channel is multiplexed or can be multiplexed is determined as the highest priority, and wherein the logical channel can be the equal priority with other logical channels that multiplex in other uplink grants or the different value of the priority of the logical channel comparing with the priority of other logical channels is less than a threshold.

10. The apparatus of claim 3, wherein determining the priority of the uplink grant is based on a potential retransmission, and the potential retransmission is determined based on a logical channel with a retransmission timer running before selecting the prioritized uplink grant, and the at least one processor:

determines whether the priority of the logical channel with the retransmission timer running is greater than a threshold.

11. The apparatus of claim 3, wherein the at least one processor performs Listen-Before-Talk (LBT) for all available uplink grants before selecting an uplink grant to prioritize among overlapped uplink grants, wherein the available uplink grants comprises configured grants and/or dynamic scheduled grants.

12. The apparatus of claim 11, wherein the at least one processor performs Listen-Before-Talk (LBT) for all available uplink grants, wherein the priority of the uplink grant is determined among the uplink grants with LBT success.

13. The apparatus of claim 3, wherein the computer-executable instructions cause the processor to:

perform LBT for the prioritized grant and a de-prioritized grant; and determine whether the prioritized grant is LBT success or LBT failure;

wherein if the prioritized grant is LBT success, the order of the priorities of the overlapped uplink grants remains unchanged; and in response to the prioritized grant being LBT failure while the de-prioritized grant is LBT success, the prioritized grant is determined as de-prioritized and the de-prioritized grant is determined as prioritized.

14. The apparatus of claim 13, wherein transmission on the prioritized grant is allowed to map generated TB(s) internally to different HARQ processes.

15. The apparatus of claim 3, wherein the priority of the uplink grant for which only LBT failure MAC CE and no data for logical channels is multiplexed in a MAC PDU is determined as the highest priority.

16. The apparatus of claim 3, wherein the priority of the uplink grant for a Scheduling Request (SR) for LBT failure MAC CE is determined as the highest priority.

17. The method of claim 1, wherein the determining further comprises:

comparing a priority of each logical channel from among the plurality of logical channels;

identifying a transmission state of the MAC PDU within each logical channel from among the initial transmission, the re-transmission state, and the urgent state; and determining the prioritized uplink grant based on the logical channel with a highest priority having data multiplexed within an uplink transmission corresponding to the prioritized uplink grant resource.

\* \* \* \* \*